(12) United States Patent
Anderson, Jr. et al.

(10) Patent No.: US 11,933,704 B2
(45) Date of Patent: Mar. 19, 2024

(54) DIGITAL DISPENSE SYSTEM

(71) Applicant: Funai Electric Co., Ltd., Osaka (JP)

(72) Inventors: James D. Anderson, Jr., Lexington, KY (US); John Glenn Edelen, Lexington, KY (US); Manish Giri, Lexington, KY (US); Michael A. Marra, III, Lexington, KY (US); Sam Norasak, Lexington, KY (US)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 17/820,370

(22) Filed: Aug. 17, 2022

(65) Prior Publication Data

US 2022/0397496 A1 Dec. 15, 2022

Related U.S. Application Data

(62) Division of application No. 16/558,141, filed on Sep. 1, 2019, now Pat. No. 11,474,007.

(60) Provisional application No. 62/788,290, filed on Jan. 4, 2019.

(51) Int. Cl.
*G01N 1/31* (2006.01)
*B01L 9/00* (2006.01)
*B41M 5/00* (2006.01)

(52) U.S. Cl.
CPC ............... *G01N 1/31* (2013.01); *B01L 9/523* (2013.01); *B41M 5/007* (2013.01); *B01L 2300/041* (2013.01); *B01L 2300/06* (2013.01); *B01L 2300/0609* (2013.01); *B01L 2300/0809* (2013.01); *G01N 2001/317* (2013.01)

(58) Field of Classification Search
None
See application file for complete search history.

(56) References Cited

U.S. PATENT DOCUMENTS

| 3,568,735 | A | 3/1971 | Lancaster |
| 6,001,309 | A | 12/1999 | Gamble et al. |
| 6,372,185 | B1 | 4/2002 | Shumate et al. |
| 6,547,358 | B1 | 4/2003 | Tanaka et al. |

(Continued)

FOREIGN PATENT DOCUMENTS

| CN | 1799841 A | 7/2006 |
| EP | 2179025 B1 | 10/2016 |
| JP | 2008151594 A | 7/2008 |

OTHER PUBLICATIONS

Anonymous: "HP D300 Digital Dispenser Operating Manual," Operating Manual, Hewlett-Packard Company, Oregon, vol. Edition C, Feb. 29, 2012, pp. 1-74.

*Primary Examiner* — Jyoti Nagpaul
(74) *Attorney, Agent, or Firm* — Luedeka Neely, P.C.

(57) ABSTRACT

A digital dispense system and methods for preparing samples for analysis. The digital dispense system includes a fluid droplet ejection system housed in a housing unit. The fluid droplet ejection system contains a fluid droplet ejection head and fluid cartridge containing one or more fluids to be dispensed. A cartridge translation mechanism is provided for moving the fluid droplet ejection head and fluid cartridge back and forth over a sample holder in an x direction. A sample tray translation mechanism moves a sample tray back and forth beneath the fluid droplet ejection head and fluid cartridge in a y direction orthogonal to the x direction.

13 Claims, 6 Drawing Sheets

(56) References Cited

U.S. PATENT DOCUMENTS

| | | |
|---|---|---|
| 6,604,806 B1 | 8/2003 | Yamada et al. |
| 6,627,157 B1 | 9/2003 | Doktycz et al. |
| 6,746,864 B1 | 6/2004 | McNeil et al. |
| 6,818,394 B1 | 11/2004 | O'Donnell-Maloney et al. |
| 6,833,112 B2 | 12/2004 | Hoummady |
| 7,024,281 B1 | 4/2006 | Unno |
| 7,135,146 B2 | 11/2006 | Johnson et al. |
| 7,199,809 B1 | 4/2007 | Lacy et al. |
| 7,401,879 B2 | 7/2008 | Isono et al. |
| 7,568,779 B2 | 8/2009 | Soma |
| 7,909,424 B2 * | 3/2011 | Giri .................. B41J 2/175 347/56 |
| 8,201,913 B2 | 6/2012 | Govyadinov et al. |
| 8,210,633 B2 | 7/2012 | Suzuki |
| 8,540,332 B2 | 9/2013 | Shibata |
| 8,658,110 B2 | 2/2014 | Giri et al. |
| 8,807,676 B2 | 8/2014 | Yoshida |
| 8,959,448 B2 | 2/2015 | Cappione et al. |
| 9,075,034 B2 | 7/2015 | Glauser et al. |
| 9,199,463 B2 | 12/2015 | Nishikawa |
| 9,224,952 B2 | 12/2015 | Harjee et al. |
| 9,492,999 B2 | 11/2016 | Ward et al. |
| 10,139,319 B2 | 11/2018 | Kubota et al. |
| 11,376,594 B2 | 7/2022 | Navawongse et al. |
| 2002/0121529 A1 | 9/2002 | Hoummady |
| 2002/0176803 A1 | 11/2002 | Hamel et al. |
| 2003/0026737 A1 | 2/2003 | Inoue |
| 2004/0021068 A1 | 2/2004 | Staats |
| 2004/0231594 A1 | 11/2004 | Edwards et al. |
| 2005/0238544 A1 | 10/2005 | Briscoe et al. |
| 2006/0057710 A1 | 3/2006 | Ishiura et al. |
| 2006/0102477 A1 | 5/2006 | Vann et al. |
| 2006/0153621 A1 | 7/2006 | Manning |
| 2007/0056351 A1 | 3/2007 | Curtis et al. |
| 2007/0185657 A1 | 8/2007 | Lacy et al. |
| 2008/0305969 A1 | 12/2008 | Dijksman et al. |
| 2009/0033692 A1 | 2/2009 | Giri et al. |
| 2009/0047440 A1 | 2/2009 | Giri et al. |
| 2009/0117620 A1 | 5/2009 | Fritchie et al. |
| 2009/0220385 A1 | 9/2009 | Brown et al. |
| 2010/0199788 A1 | 8/2010 | Ayliffe et al. |
| 2010/0266794 A1 | 10/2010 | Wright et al. |
| 2010/0322822 A1 | 12/2010 | Fritchie et al. |
| 2013/0105042 A1 | 5/2013 | Brown et al. |
| 2013/0123119 A1 | 5/2013 | Abdela et al. |
| 2014/0112839 A1 | 4/2014 | Richardson |
| 2014/0320513 A1 | 10/2014 | Ogi |
| 2015/0045234 A1 | 2/2015 | Stone et al. |
| 2015/0210075 A1 | 7/2015 | Nishikawa |
| 2016/0238623 A1 | 8/2016 | Sun et al. |
| 2017/0043336 A1 | 2/2017 | Khattak et al. |
| 2018/0272345 A1 | 9/2018 | Higuchi et al. |
| 2018/0272770 A1 | 9/2018 | Tobita |
| 2019/0212350 A1 | 7/2019 | Wolton |
| 2021/0165007 A1 | 6/2021 | Nielsen et al. |

* cited by examiner

DIGITAL DISPENSE SYSTEM

RELATED APPLICATION

This application is a division of application Ser. No. 16/558,141, filed Sep. 1, 2019, now allowed which claims priority to provisional application Ser. No. 62/788,290, filed Jan. 4, 2019.

TECHNICAL FIELD

The disclosure is directed to analytical instruments and in particular to instruments that are used to dispense fluids for analytical purposes.

BACKGROUND AND SUMMARY

In the medical field, in particular, there is a need for automated sample preparation and analysis. The analysis may be colorimetric analysis or require the staining of samples to better observe the samples under a microscope. Such analysis may include drug sample analysis, blood sample analysis and the like. In the analysis of blood, for example, blood is analyzed to provide a number of different factors that are used to determine the health of an individual. When there are a large number of patients that require blood sample analysis, the procedures may be extremely time consuming. Also, there is a need for accurate preparation of the samples so that the results can be relied on. There are many other situations that require sample analysis in the medical field and in other fields that can benefit from the use of analytical instruments that provide accurate and reproduceable results, such as micro-titration of multiple samples.

Well plates, slides and other substrates are used for many experiments and laboratory procedures. The process of filling the wells or spotting glass slides is often performed manually or using expensive lab equipment. In some cases, the wells are filled with hand operated pipettes. In other cased, high-end automated devices based on pipette technology are used to fill the well plates. Such automated devices accommodate an open well dispense head only. The open well dispense head is a dispense head where a small amount of fluid must be deposited into an opening in the dispense head before use. The fluid is typically deposited manually using a pipette or similar means. The dispense head is held stationary while moving the microplate in both x and y directions. These high end devices are extremely expensive. Accordingly, there is a need for a digital dispense system that can be used in a wide variety of analytical situations for analysis and digital titration of samples on glass slides and micro-well plates that is much less expensive to purchase and adaptable to different numbers of glass slides and different sizes of micro-well plates.

In view of the foregoing, an embodiment of the disclosure provides a digital dispense system and method for preparing samples for analysis. The digital dispense system includes a fluid droplet ejection system housed in a housing unit. The fluid droplet ejection system contains a fluid droplet ejection head and fluid cartridge containing one or more fluids to be dispensed. A cartridge translation mechanism is provided for moving the fluid droplet ejection head and fluid cartridge back and forth over a sample holder in an x direction. A sample tray translation mechanism moves a sample tray back and forth beneath the fluid droplet ejection head and fluid cartridge in a direction orthogonal to the x direction.

In another embodiment there is provided a method for staining glass slides without immersing the slides in a dye. The method includes providing a digital fluid droplet ejection system housed in a housing unit. The fluid droplet ejection system includes a fluid droplet ejection head and fluid cartridge containing one or more fluids to be dispensed. A cartridge translation mechanism is provided for moving the fluid droplet ejection head and fluid cartridge back and forth over a slide holder in an x direction. A sample tray for holding one or more glass slides is also provided. The sample tray includes a sample tray adapter configured to hold the one or more glass slides in the sample tray. A sample tray translation mechanism is provided for moving the sample tray and one or more glass slides back and forth beneath the fluid droplet ejection head and fluid cartridge in a direction orthogonal to the x direction. Fluid is ejected from the fluid droplet ejection head and fluid cartridge in one or more locations on the one or more glass slides.

A further embodiment provides a method for processing samples in wells of a micro-well plate for analysis. The method includes providing a digital fluid droplet ejection system housed in a housing unit. The fluid droplet ejection system contains a fluid droplet ejection head and fluid cartridge containing one or more fluids to be dispensed. A cartridge translation mechanism is provided for moving the fluid droplet ejection head and fluid cartridge back and forth over a micro-well plate sample tray in an x direction. A sample tray translation mechanism is also provided for moving the sample tray containing the micro-well plate through the fluid droplet ejection device in a y direction orthogonal to the x direction. During the process fluid is ejected from the fluid droplet ejection head and fluid cartridge into one or more wells in the micro-well plate.

In some embodiments, the sample tray further includes a tray adapter for holding one or more glass slides or a micro-well plate.

In some embodiments, two or more fluids are ejected on a slide or into wells of a micro-well plate simultaneously. In other embodiments two or more fluids are ejected on a slide or into wells of a micro-well plate sequentially.

In some embodiments, the tray adapter is a glass slide adapter for holding one or more glass slides. In one embodiment, the glass slide adapter is selected from an adapter configured to hold one glass slide, an adapter configured to hold two glass slides, and an adapter configured to hold three glass slides. In other embodiments, the tray adapter is a micro-well plate adapter for holding a micro-well plate. In still other embodiments the tray adapter is sized for different size micro-well plates.

In some embodiments, the sample tray further includes a spring-loaded lever for positioning glass slides or a micro-well plate in the sample tray so that the glass slides or micro-well plate are in a predetermined location for fluid droplet ejection. In other embodiments, a distal end of the spring loaded lever abuts a chamfer on one corner of the micro-well plate or a chamfer on one corner of a glass slide adapter.

While only a small number of slides may be processed at one time in the digital dispense system, each well plate may have 96, 384, or 1536 wells or may have a customized number of wells depending on the application and analysis to be performed. Likewise, analysis may include the use of one, two, or three glass slides at a time. Embodiments of the disclosure provide unique and quite efficient system for handling different numbers of glass slides and different size micro-well plates in a digital dispense system. The system described herein may also be adapted to provide multi-analyte and biofluid dispensing and analysis on a substrate that contains both glass slides and micro-well plates of

BRIEF DESCRIPTION OF THE DRAWINGS

FIG. 7 is a perspective view, not to scale, of the tray of FIG. 4 holding a micro-well plate for the digital dispense system of FIG. 1.

DETAILED DESCRIPTION OF EXEMPLARY EMBODIMENTS

With reference to FIGS. 1-4 there is shown a digital dispense system 10 for accurately dispensing an amount of one or more fluids into the wells of a micro-well plate, or in some defined pattern of spots on one or more glass slides (commonly referred to as spotting). Unlike the high-end digital dispense devices, the system 10 of the present invention is based on an ejection head and fluid cartridge 12 that moves back and forth in a first direction and a sample tray 14 containing the well plate or slides that moves back and forth in a second direction orthogonal to the first direction, as described in more detail below. The disclosed device 10 can accept open and closed ejection fluid cartridges. The sample tray 14 is adaptable to standard micro-well plates, customized micro-well plates and glass slides. The ejection head on the ejection head and fluid cartridge 12 may be selected from a wide variety of ejection head devices including, but not limited to, thermal jet ejection heads, bubble jet ejection heads, piezoelectric ejection heads, and the like.

Figure 1:
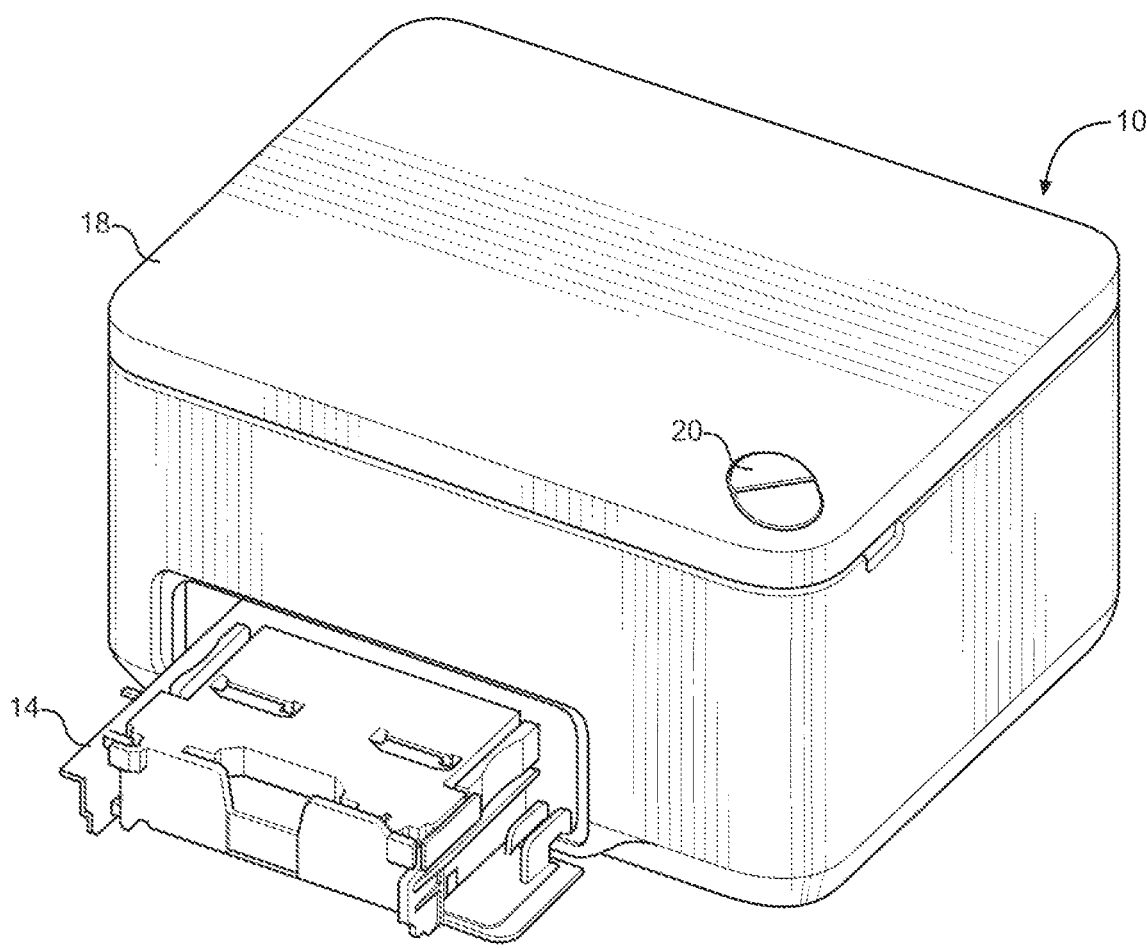
FIG. 1 is a perspective view, not to scale, of a digital dispense system according to an embodiment of the disclosure.
Figure 2:
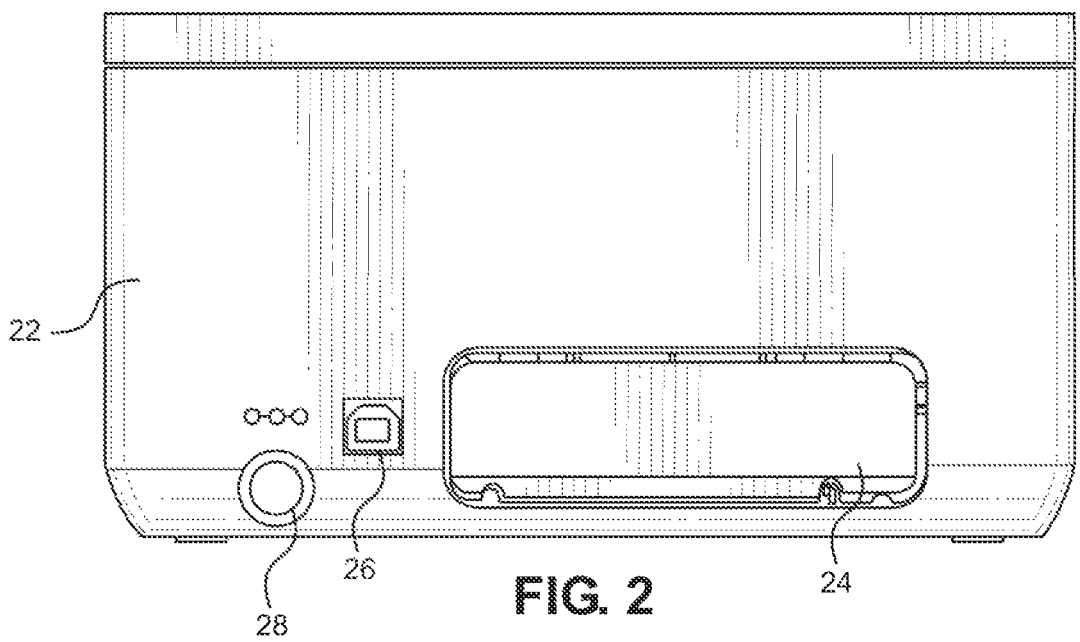
FIG. 2 is an elevational view, not to scale, of a back side of the digital dispense system of FIG. 1.
Figure 3:
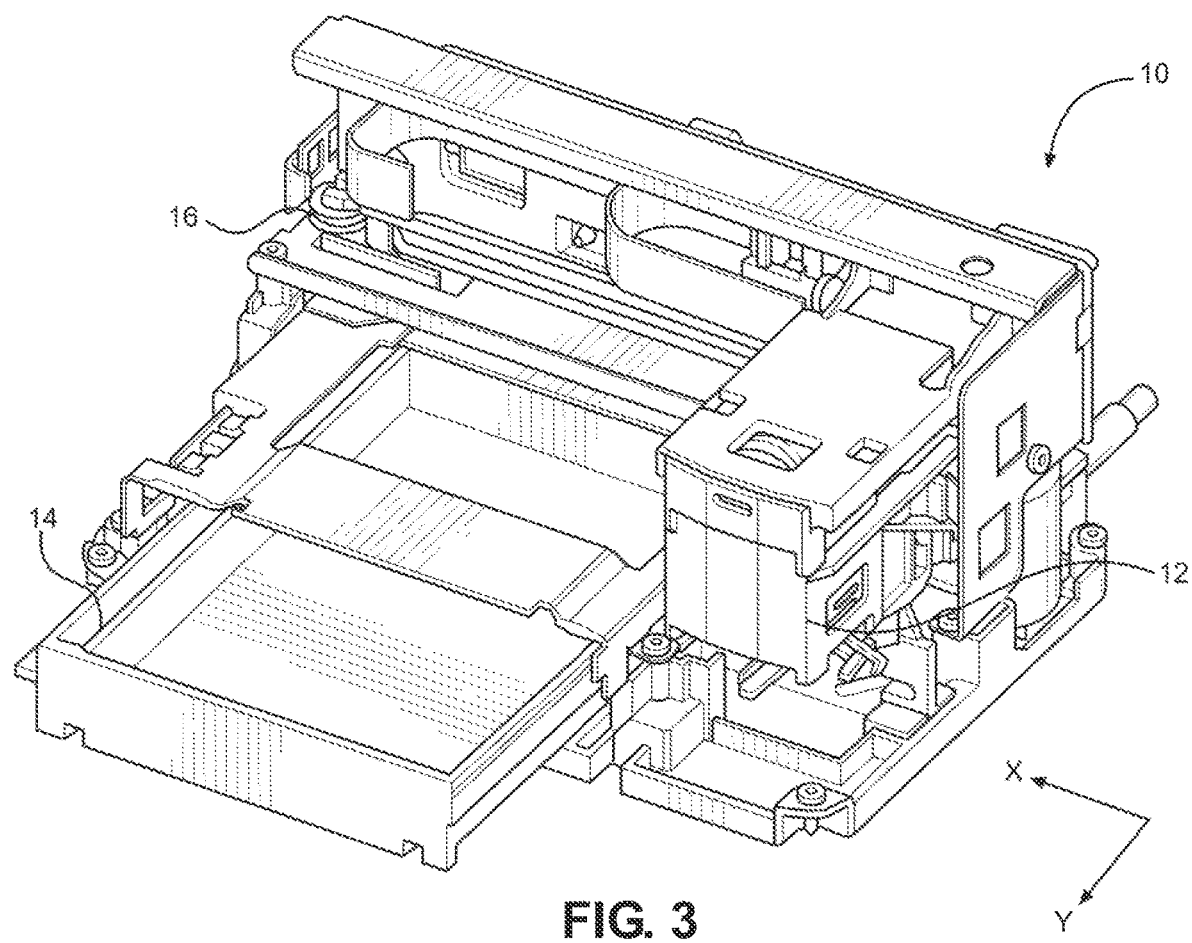
FIG. 3 is a perspective cutaway view, not to scale, of the digital dispense system of FIG. 1.
Figure 4:
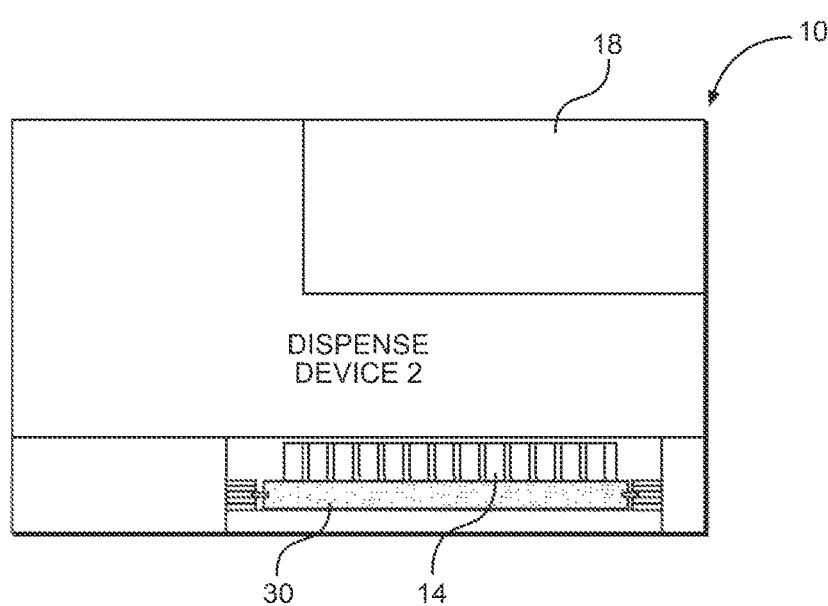
FIG. 4 is a schematic view of the digital dispense system of FIG. 1 showing a sample tray and micro-well plate in a position inside the digital dispense system for fluid deposition onto the micro-well plate.

The ejection head and fluid cartridge 12 is moved back and forth in an x direction by a cartridge movement mechanism 16 (FIG. 3) both of which are contained in a rectangular prism-shaped box 18. An activation switch 20 is included on the box 18 for activating the system 10. A rear side 22 of the box 18 includes an opening 24 for movement of the sample tray 14 through the box 18 in the second direction orthogonal to the x direction to dispense fluid into the micro-well plate or slides. A USB port 26 is provided on the rear side 22 of the box 18 to connect the digital dispense system 10 to a computer or a digital display device. Power is provided to the system 10 through a power input port 28 on the rear side 22 of the box 18. FIG. 4 illustrates a view through the box 18 of the digital dispense system 10 showing the sample tray 14 containing a micro-well plate in position within the system for fluid deposition thereto. A sample tray movement mechanism 30 provides movement of the sample tray 14 in a direction through the system that is orthogonal to the movement of the ejection head and fluid cartridge 12.

Figure 5:
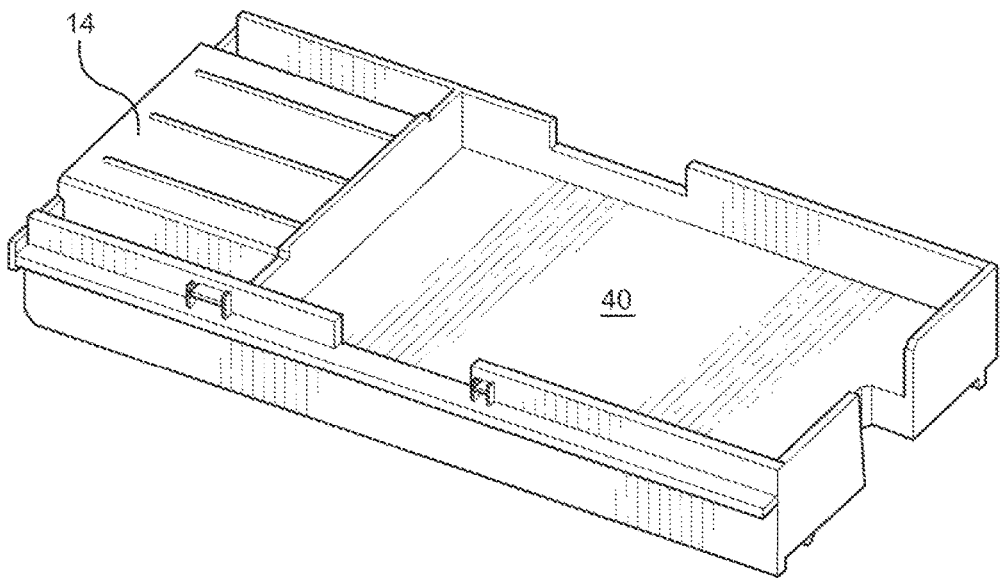
FIG. 5 is a perspective view, not to scale, of a tray for holding samples for use with the digital dispense system of FIG. 1.
Figure 6:
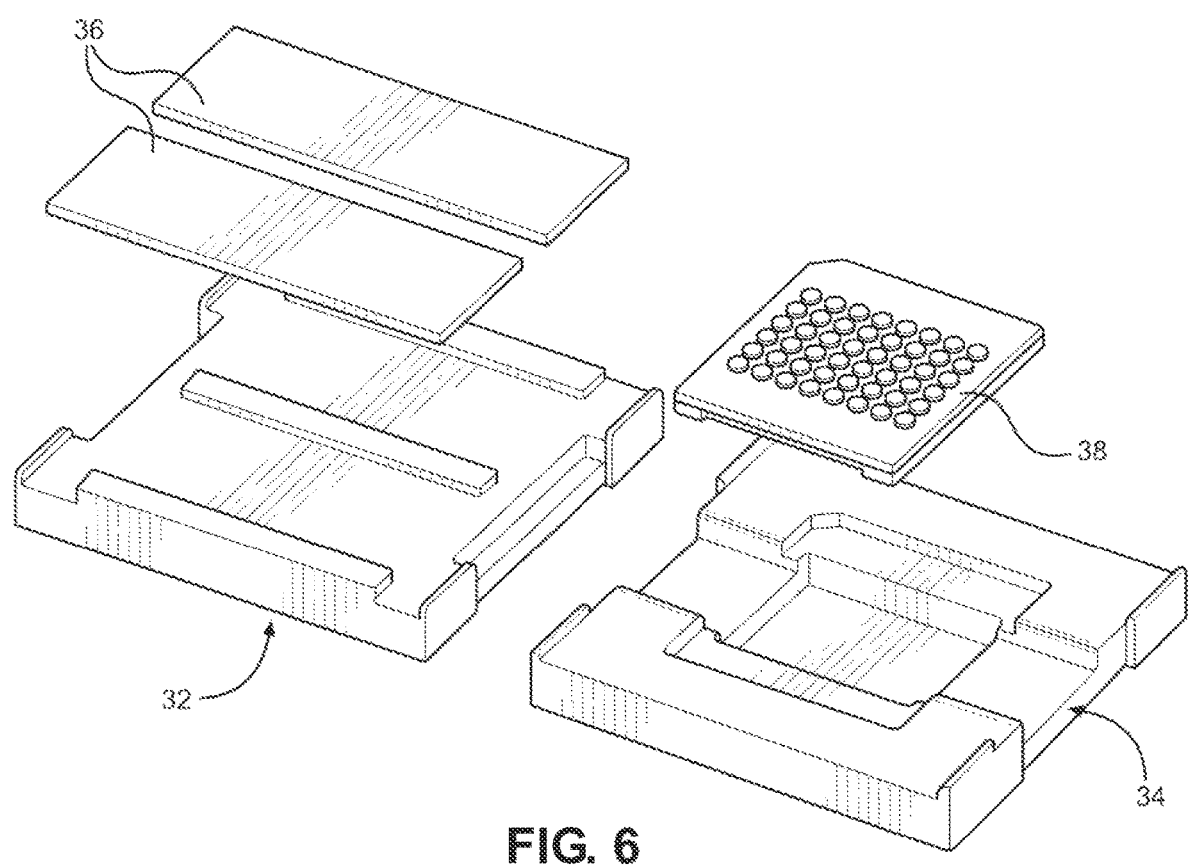
FIG. 6 is a perspective view, not to scale, of adapters for glass slides and micro-well plates for use with the tray of FIG. 5.
Figure 7:
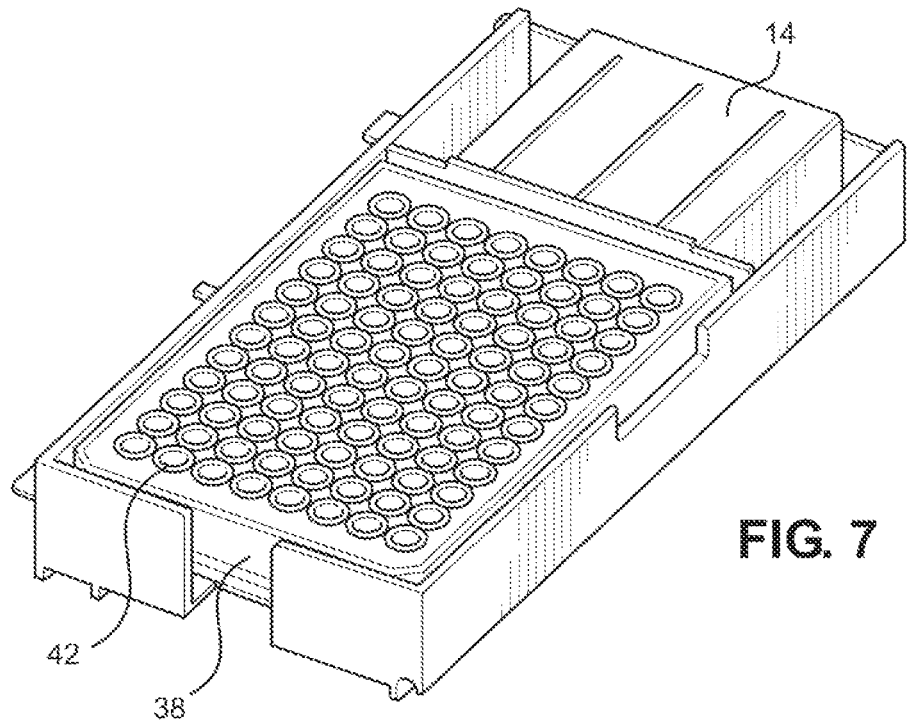
FIG. 7 is a perspective view, not to scale, of the tray of FIG. 4 holding a well plate adapter and micro-well plate for the digital dispense system of FIG. 1.
Figure 8:
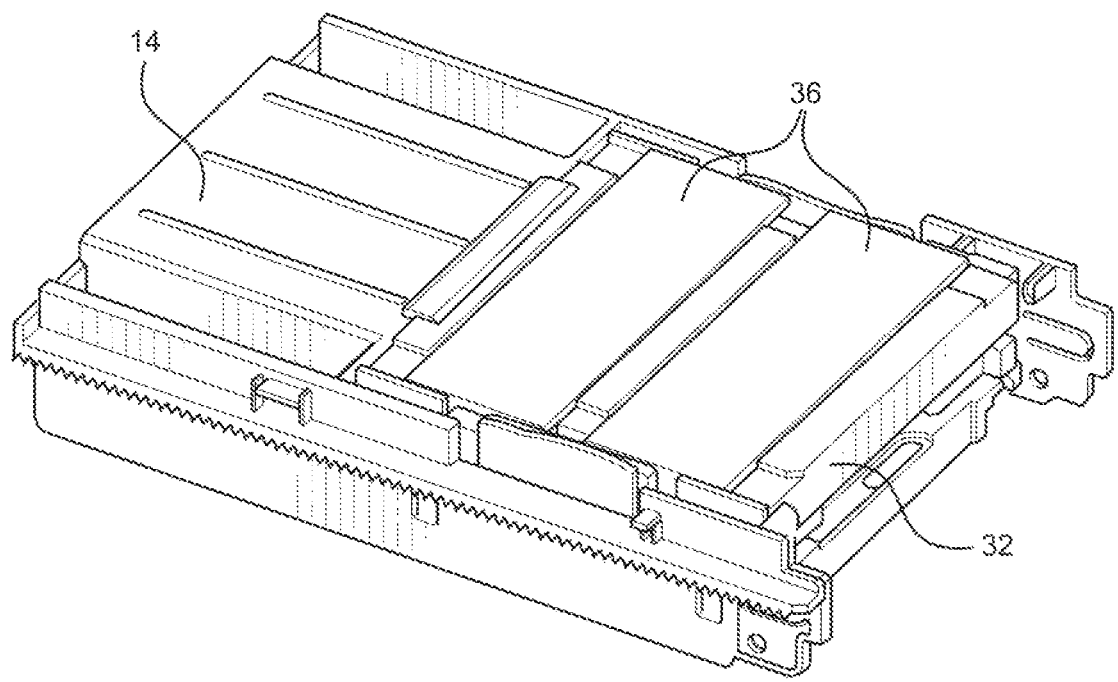
FIG. 8 is a perspective view, not to scale, of the tray of FIG. 4 holding a glass slide adapter and glass slides for the digital dispense system of FIG. 1.

The sample tray 14 and adapters 32 and 34 for the sample tray 14 are illustrated in FIGS. 5 and 6. The adapters 32 and 34 are unique aspects of the disclosed embodiments that enable much more flexibility in the use of the system 10 to deposit fluids on a variety of surfaces. The adapter 32 is particularly suitable for holding two glass slides 36 as shown, however, an adapter to hold only one glass slide or three glass slides may also be used. Adapter 40 is specifically designed to hold a micro-well plate 38. Both adapters 32 and 34 are configured to fit into an adapter holding space 40 in the sample tray 14. In some embodiments, as described in more detail below, the micro-well plate 38 is disposed directly in the holding space 40 of the tray 14 in the absence of the adapter 34. FIG. 7 illustrates a micro-well plate 38 containing a plurality of wells 42 disposed directly in the holding space 40 (FIG. 5) of the tray 14. FIG. 8 illustrates glass slides 36 on the glass slide adapter 32 in the sample tray 14.

Figure 9A:
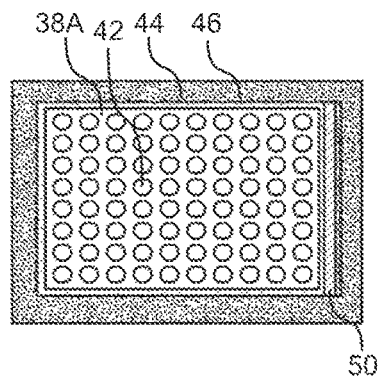
FIGS. 9A-9C are schematic plan views, not to scale, of a sample tray, and a well plate adapter for holding different sizes of micro-well plates in the sample tray.
Figure 9B:
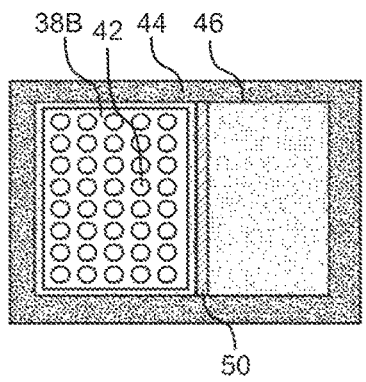
Figure 9C:
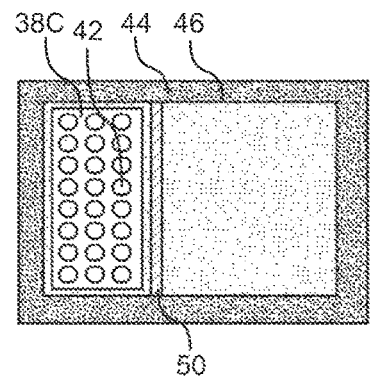

In some embodiments, as illustrated in FIGS. 9A-9C, different size micro-well plates 38A, 38B, or 38C may be used to prepare and analyze samples using the digital dispense system 10 described above. In order to accommodate various micro-well plate sizes, a sample tray 44 specifically designed to accommodate a well plate adapter 46 may be used. The well plate adapter 46 may contain a gate 50 that may be used to restrict the position of the micro-well plate 38A, 38B and 38C in well plate adapter 46 as shown. In some embodiments, the gate is molded into the well plate adapters 46. In other embodiments, the gate 50 is adjustable with respect to the well plate adapter 46 so as to accommodate a wide variety and sizes of micro-well plates 38A-38C.

Figure 10:
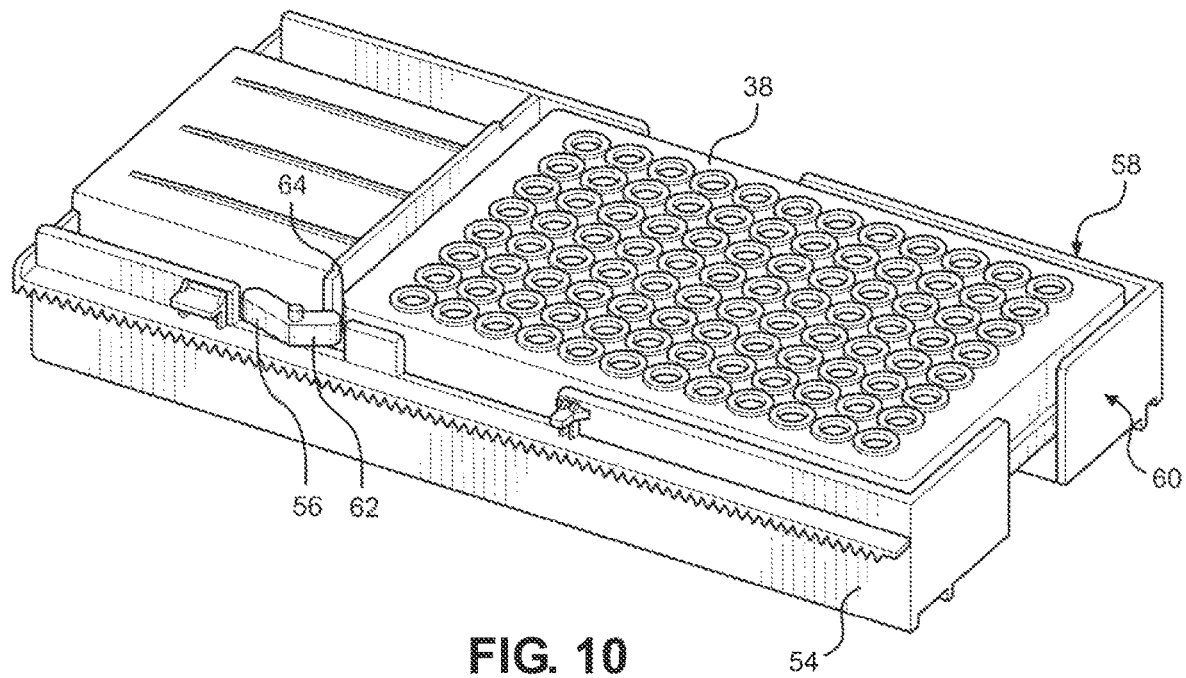
FIG. 10 is a perspective view, not to scale of a micro-well plate in a tray according to another embodiment of the disclosure.
Figure 11:
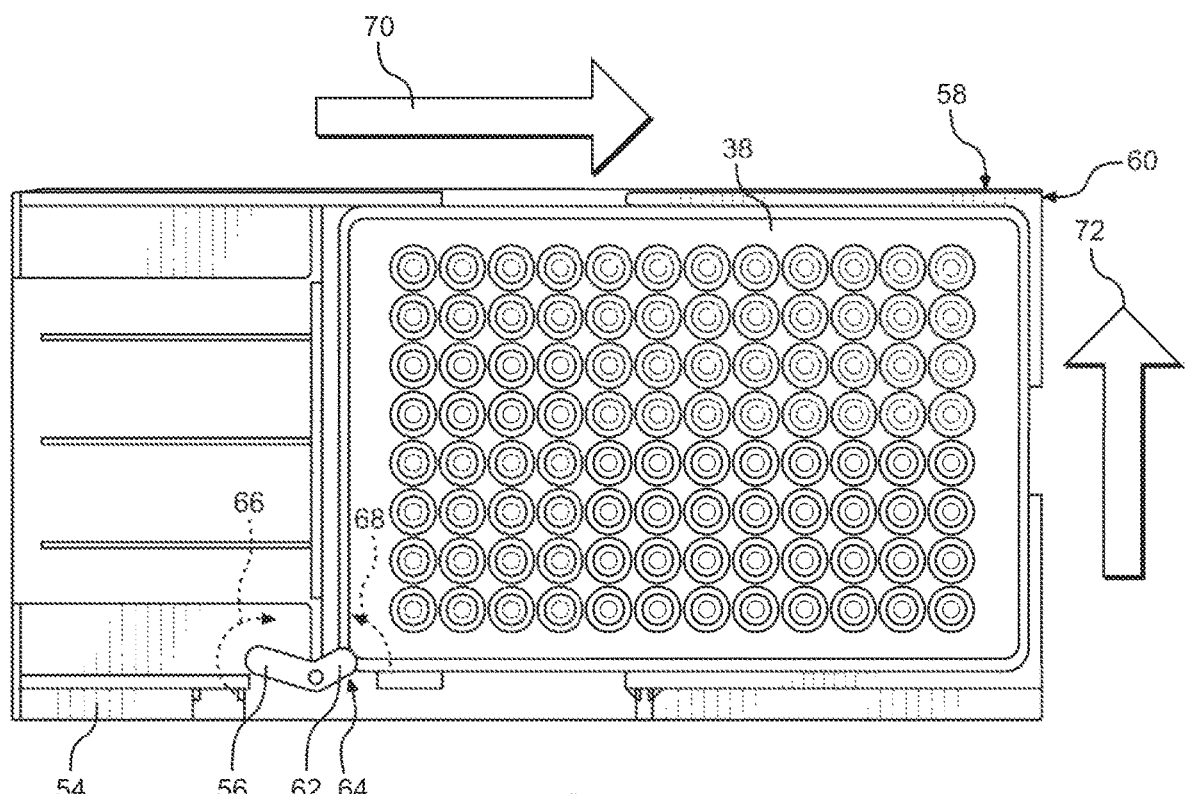
FIG. 11 is a plan view, not to scale of the micro-well plate in the tray of FIG. 10.

In order for the system 10 to deposit fluids in the precise well locations on the micro-well plate 38, an embodiment of the disclosure provides a device for urging a micro-well plate 38 or glass-slide adapter 32 into a pre-determined registration position within a sample tray 54 is illustrated in FIGS. 10-11. FIG. 10 is a perspective view of the tray 54 having a registration device 56 for urging the micro-well plate 38 into the predetermined registration position so that the micro-well plate 38 abuts edges 58 and 60 of the tray 54. The registration device 56 may be a spring-loaded lever that has a distal end 62 that abuts a chamfer 64 of the micro-well plate 38 in order to urge the micro-well plate 38 toward edges 58 and 60 of the tray 54. Accordingly, the registration device 56 may be rotated clockwise in the direction of arrow 66 to load the micro-well plate 38 into the tray 54. Once the micro-well plate 38 is loaded into the tray 54, the registration device 56 is released and a spring (not shown) causes the registration device 56 to rotate in a counter-clockwise direction indicated by arrow 68 so that the distal end 62 of the registration device 56 abuts the chamfer 64 of the micro-well plate 38 thereby urging the micro-well plate 38 in the direction of arrows 70 and 72. Accordingly, the registration device 56 enables precise deposition of fluid into the wells 42 of the micro-well plate 38.

For a given volume of fluid to be deposited on a glass slide 36 or into wells 42 of a micro-well plate 38 using the system 10 described above, the number of drops required to dispense a given volume of fluid is defined as (volume/drop size). For example, if a drop size is selected as 10 pico-liters, and it is required to dispense 10 micro-liters, then the ejection head and fluid cartridge 12 will have to dispense $10/10^{e-6}$ or 1,000,000 drops. Now that the number of drops is determined for the given volume, the area can be calculated. Most inkjet printers print on a grid that has a specific resolution, for example 600H×1200V DPI (drops per inch). If the target area is a square that is 0.5 inches×0.5 inches, then the maximum number of drops that can be dispensed in that area with one pass of the ejection head and fluid cartridge 14 can be calculated as follows:

$$Area = 0.5*0.5 = 0.25 \text{ inches}^2$$

$$\text{Maximum drops in one pass} = Area*(600\times1200) = 180{,}000 \text{ drops.}$$

Finally, the total number of passes required to spread this volume over the selected area can be calculated as follows:

$$1{,}000{,}000/180{,}000 = 5.56 \text{ passes.}$$

Accordingly, the ejection head and fluid cartridge 12 will need to make 5 full passes, and then a 'remainder' pass that is not entirely full to dispense the volume of fluid calculated over a given area. Each of the passes will spread the drops consistently over the area.

The input data that is created by the foregoing calculations is effectively an image representing both X and Y axes, but also introducing a Z axis that represents volume. In addition, when dispensing more than 1 channel or fluid at once, a $4^{th}$ dimension is introduced to track the different channels or fluids.

The foregoing assumes an ejection head on the ejection head and fluid cartridge 12 has a length of 0.5 inches and can cover the entire area. This is not always be the case, so an additional variable must be introduced, which is the length of the ejection head. For example, if we continue the example from above, but assume that ejection head has a length of 0.25 inches, this introduces a requirement to move either the ejection head and fluid cartridge 12 over the slide or well plate in the x direction to fill in the area correctly. Furthermore, there may be reasons in certain applications to increase the number of passes beyond what is the minimum required. Some examples could include:

To improve some aspect of the output (coverage, uniformity, etc.)
To artificially limit the maximum volume per pass for experimental reasons.

Variations may be achieved by setting an artificial minimum number of passes for the job. This becomes a multiplier to be used with the required number of passes. So, if the minimum number of passes of 2, then a 50% maximum limit can be set on the number of drops in each pass, which will multiply the total number of passes by 2 overall.

The foregoing method provides benefits over traditional digital dispense systems which may print the entire volume of fluid into a micro-plate well in a single operation. The foregoing method spreads the volume of fluid to be dispensed over multiple dispense head passes and multiple fluid ejectors along a dispense head array of an ejection head. This will minimize the impact of missing or poorly performing fluid ejectors. Depending on the desired dispense accuracy and probability of ejectors not functioning correctly, a minimum number of fluid ejectors to use can be specified or calculated.

In fields such as hematology it may be desirable to deposit or print multiple stains or buffers over a defined area of a substrate such as a glass slide. When printing layers of fluid, the test may be improved by controlling the rate at which the fluid is deposited. The digital dispense system 10 described herein will enable a user to better control the deposition rate.

In some embodiments, the digital dispense system 10 according to the disclosure enables a volume of fluid to be spread consistently over an area/shape that is specified. It also enables a mode to be defined that minimizes variations by distributing ejector head nozzle usage over the entire ejection head. A minimum number of passes of the ejection head and fluid cartridge 12 can be specified along with a maximum volume per pass. If the maximum volume per pass exceeds a defined flow rate, additional passes can be added to the operation mode. The dispense system 10 can be scaled to dispense one or more fluids onto a glass slide or micro-well plate.

In some embodiments, the sample tray 14 described above can be use with glass slides to dispense fluids on the glass slides to analyze body fluids such as blood. The glass slides with bloods smears may be stained with multiple stains and other fluid types selectively or simultaneously using the digital dispense system 10 according to the disclosure in order to create stained slides for studying cells types in blood samples. The use of stains to identify the blood cells has been used for a long time, but the technique for putting stains on slides is very tedious.

Romanowsky type stains have been used to identify red blood cell (RBC) and white blood cell (WBC) from blood smears on glass slides. Most laboratories use some form of Romanowsky type stain (e.g. Wright-Giemsa). These stains give excellent results but the method to put the stains on slides is cumbersome. In the conventional method, the slides with blood smears are dipped in stains for a period of time. However, dipping slides is labor and time intensive. As described above, the digital dispense system 10 provides an improved technique for creating stained slides for studying cell types in blood samples by depositing precise amounts of fluids in defined locations on the slides.

In some embodiments, stains such as Giemsa stain for May Grunwald and Giemsa stain or any other type of stains and a buffer solution may then be deposited simultaneously or selectively onto the glass slides. The digital dispense system 10 provides the flexibility of either jetting one, two or more stains and buffer solutions simultaneously or selectively. The amount of stains used by this method is much less compared to the dipping technique. The use of this technique is not limited to Giemsa and May Grunwald stains. It can be used with any other fluid that meets the requirements of fluid ejection technology. A predetermined volume of each fluid can be deposited onto a sample using the dispense system 10 described above.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A digital dispense system for preparing samples for analysis, comprising
   a fluid droplet ejection system housed in a housing unit, the fluid droplet ejection system including:
   a fluid droplet ejection head and fluid cartridge containing one or more fluids to be dispensed,
   a cartridge translation mechanism configured for moving the fluid droplet ejection head and fluid cartridge back and forth over a sample holder in an x direction; and
   a sample tray translation mechanism configured for moving a sample tray back and forth beneath the fluid droplet ejection head and fluid cartridge in a y direction orthogonal to the x direction, wherein the sample tray further comprises a biasing means configured to bias the glass slides or micro-well plate in the sample tray to a predetermined location.

2. The digital dispense system of claim 1, wherein sample tray further comprises a glass slide adapter configured for holding one or more glass slides.

3. The digital dispense system of claim 2, wherein the glass slide adapter is selected from the group consisting of an adapter configured to hold one glass slide, an adapter configured to hold two glass slides, and an adapter configured to hold three glass slides.

4. The digital dispense system of claim 1, wherein the sample tray further comprises a micro-well plate adapter configured for holding a micro-well plate.

5. The digital dispense system of claim 4, wherein the micro-well plate adapter is sized for different size micro-well plates.

6. The digital dispense system of claim 1, wherein the biasing means comprises a spring-loaded lever configured for positioning glass slides or a micro-well plate in the sample tray so that the glass slides or micro-well plate are in a predetermined location for fluid droplet ejection.

7. The digital dispense system of claim 6, wherein a distal end of the spring loaded lever abuts a chamfer on one corner of the micro-well plate or a chamfer on one corner of a glass slide adapter.

8. A method for staining glass slides without immersing the slides in a dye, comprising:
   providing a digital fluid droplet ejection system housed in a housing unit, the fluid droplet ejection system including:
   a fluid droplet ejection head and fluid cartridge containing one or more fluids to be dispensed,
   a cartridge translation mechanism configured for moving the fluid droplet ejection head and fluid cartridge back and forth over a slide holder in an x direction,
   a sample tray configured for holding one or more glass slides;
   a sample tray adapter configured to hold one or more glass slides in the sample tray, and
   a sample tray translation mechanism configured for moving the sample tray and one or more glass slides back and forth beneath the fluid droplet ejection head and fluid cartridge in a y direction orthogonal to the x direction, wherein the sample tray comprises a biasing means;
   biasing the glass slides or micro-well plate in the sample tray to a predetermined location using the biasing means; and
   ejecting fluid from the fluid droplet ejection head and fluid cartridge in one or more locations on the one or more glass slides.

9. The method of claim 8, further comprising ejecting two or more fluids onto the slides simultaneously.

10. The method of claim 8, further comprising ejecting two or more fluids onto the slides sequentially.

11. A method for processing samples in wells of a micro-well plate for analysis, comprising:
    providing a digital fluid droplet ejection system housed in a housing unit, the fluid droplet ejection system including:
    a fluid droplet ejection head and fluid cartridge containing one or more fluids to be dispensed,
    a cartridge translation mechanism configured for moving the fluid droplet ejection head and fluid cartridge back and forth over a micro-well plate sample tray in an x direction,
    a sample tray translation mechanism configured for moving the sample tray containing the micro-well plate through the fluid droplet ejection device in a y direction orthogonal to the x direction, wherein the sample tray comprises a biasing means;
    biasing the glass slides or micro-well plate in the sample tray to a predetermined location using the biasing means; and
    ejecting fluid from the fluid droplet ejection head and fluid cartridge into one or more wells in the micro-well plate.

12. The method of claim 11, further comprising ejecting two or more fluids into wells of the micro-well plate simultaneously.

13. The method of claim 11, further comprising ejecting two or more fluids into wells of the micro-well plate sequentially.

* * * * *